(12) United States Patent
Ohashi et al.

(10) Patent No.: US 7,785,738 B2
(45) Date of Patent: Aug. 31, 2010

(54) LITHIUM-ION SECONDARY BATTERY AND METHOD OF MANUFACTURING LITHIUM-ION SECONDARY BATTERY

(75) Inventors: Yoshihiko Ohashi, Tokyo (JP); Keita Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/338,429

(22) Filed: Dec. 18, 2008

(65) Prior Publication Data

US 2009/0214945 A1  Aug. 27, 2009

(30) Foreign Application Priority Data

Dec. 28, 2007  (JP)  ............... 2007-340273

(51) Int. Cl.
 *H01M 4/46* (2006.01)
 *H01M 2/02* (2006.01)
 *H01M 4/82* (2006.01)
(52) U.S. Cl. .................. 429/153; 429/163; 29/623.2
(58) Field of Classification Search ........... 429/163, 429/152, 153
See application file for complete search history.

(56) References Cited

U.S. PATENT DOCUMENTS

2004/0038123 A1 * 2/2004 Hisamitsu et al. ........... 429/147

FOREIGN PATENT DOCUMENTS

JP  H-11-329382  11/1999

* cited by examiner

*Primary Examiner*—Dah-Wei D Yuan
*Assistant Examiner*—Stephan Essex
(74) *Attorney, Agent, or Firm*—Oliff & Berridge PLC

(57) ABSTRACT

The lithium-ion secondary battery has a portion where a thickness of a sealing member from a surface of an outer package to a surface of a lead in a laminating direction of electrode bodies on one side of the lead differs from that on the other side of the lead such that two leads connected to each electrode body are arranged within the same plane perpendicular to the laminating direction of the electrode bodies. The electrode bodies are laminated in the outer package such as to yield portions where only one of the planar leads of a first electrode body overlaps one of the planar leads of a second electrode body in the laminating direction of the electrode bodies in the opening part of the outer package.

5 Claims, 8 Drawing Sheets

LITHIUM-ION SECONDARY BATTERY AND METHOD OF MANUFACTURING LITHIUM-ION SECONDARY BATTERY

BACKGROUND OF THE INVENTION

1. Field of the Invention

The present invention relates to an electrochemical device and a method of manufacturing an electrochemical device.

2. Related Background Art

As electronic devices have recently been becoming smaller and thinner and attaining a higher output, power supplies for the electronic devices have been demanded to reduce their size and thickness and achieve a higher output.

An example of the power supplies for electronic devices is a film-like battery in which a film-like power generating element including a film-like electrolyte interposed between positive and negative electrode plates is sealed with an outer package arranged on both sides thereof as shown in Japanese Patent Application Laid-Open No. 11-329382. At parts for taking out the positive and negative electrode terminals in the film-like power generating element in this film-like battery, the positive and negative electrode terminals are sealed through film-like sealing members arranged on both sides thereof.

SUMMARY OF THE INVENTION

As one of methods for increasing the output of a power supply for an electronic device, a plurality of film-like power generating elements may be laminated, so as to be connected in series. That is, the film-like power generating devices may be laminated such that one of the positive and negative electrode terminals of one film-like power generating element and one of the negative and positive electrode terminals of the other film-like power generating element may be connected to each other in an overlapping manner, while the positive and negative electrode terminals that are not connected to each other are kept from overlapping each other in the laminating direction.

However, a multilayer body in which a plurality of film-like power generating elements are laminated as mentioned above may exhibit uneven thicknesses in the laminating direction. When the multilayer body having uneven thicknesses is accommodated in an outer package for a battery, a sealant (sealing member) positioned at the opening part of the outer package also exhibits uneven thicknesses. When the opening part is sealed under such a condition, a gap which is free of the sealing member tends to be formed in the opening part after sealing, so as to lower the hermeticity of the outer package, thereby deteriorating the moisture resistance of the battery.

When the sealing member of the multilayer body positioned at the opening part has uneven thicknesses, the opening part tends to be shaped unevenly at the time of fusing with the sealing member and distort after sealing. When mounted to an electronic device, a battery having a distorted opening part may fail to be placed normally on a flat surface, thereby shifting the negative and positive electrode terminals from their predetermined positions within the electronic device. Also, distortions in the opening part may cause unnecessary stresses to act on the battery, thereby causing failures of the battery. The distortions in the opening part further tend to deform the positive and negative electrode terminals positioned at the opening part or shift the positions of positive and negative electrode terminals in the opening part, thereby lowering the reliability of the battery.

In view of the problems of the prior art mentioned above, it is an object of the present invention to provide an electrochemical device which can improve output and restrain distortions and gaps from being formed at an opening part of an outer package, and a method of manufacturing such an electrochemical device.

For achieving the above-mentioned object, the electrochemical device in accordance with the present invention comprises electrode bodies each having positive and negative electrodes laminated with a separator interposed therebetween, an outer package accommodating a multilayer body formed by laminating at least two of the electrode bodies, planar leads respectively connected to the positive and negative electrodes while extending from the multilayer body to the outside of the outer package, and a sealing member in close contact with surroundings of the leads and held by an opening part of the outer package so as to seal the opening part; wherein the at least two electrode bodies are laminated such as to yield portions where different numbers of the leads overlap each other in the laminating direction of the electrode bodies in the opening part; and wherein the electrochemical device has a portion where a thickness of the sealing member from a surface of the outer package to a surface of the lead in the laminating direction of the electrode bodies on one side of the lead differs from that on the other side of the lead such that the two leads connected to one electrode body are arranged within the same plane perpendicular to the laminating direction of the electrode bodies.

When a pair of leads overlapping each other while being adjacent to each other in the laminating direction of electrode bodies and connected to respective electrodes having polarities different from each other are electrically connected to each other in the portions where different numbers of leads overlap each other in the laminating direction in the opening part, the electrode bodies can be connected in series, so as to improve the output of the electrochemical device.

When the thickness of the sealing member from a surface of the outer package to a surface of the lead in the laminating direction of the electrode bodies on one side of the lead differs from that on the other side of the lead such that the two leads connected to one electrode body are arranged within the same plane perpendicular to the laminating direction of the electrode bodies, the total thickness of the sealing member and lead positioned at a lead takeout portion of the opening part becomes substantially uniform in the laminating direction of the electrode bodies. Therefore, the opening part is completely filled with the sealing member that is in close contact with the surroundings of the leads, whereby distortions in the sealed opening part can be suppressed.

The method of manufacturing an electrochemical device in accordance with the present invention comprises an electrode body forming step of forming an electrode body having positive and negative electrodes laminated with a separator interposed therebetween; a terminal member forming step of holding a part of one or two planar leads by a band-like sealing member from both sides of the lead so as to form a terminal member made of the one or two leads and the sealing member; an elemental device forming step of electrically connecting respective leads of the terminal member to the positive and negative electrodes of the electrode body so as to form an elemental device in which two leads having the sealing member attached thereto are connected to one electrode body; a multilayer body forming step of forming a multilayer body by laminating at least two elemental devices; an accommodating step of accommodating the multilayer body in an outer package having an opening part; and a sealing step of fusing the sealing member of the multilayer body and the opening part together so as to seal the opening part while the leads extend from a lead takeout portion of the opening part to the outside of the outer package; wherein the at least two elemental devices are laminated such as to yield portions where different numbers of leads overlap each other in the laminating direction of the elemental devices in the opening part in the multilayer body forming step; and wherein the sealing member of the multilayer body and the opening part are fused together while providing a portion where a thickness of the sealing member from a surface of the outer package to a surface of the lead in the laminating direction of the electrode bodies on one side of the lead differs from that on the other side of the lead in the sealing step such that the two leads connected to one electrode body are arranged within the same plane perpendicular to the laminating direction of the electrode bodies after the sealing step.

The method of manufacturing an electrochemical device in accordance with the present invention can easily make the electrochemical device of the present invention. That is, by laminating at least two elemental devices such as to yield portions where different numbers of leads overlap each other in the laminating direction of the elemental devices in the opening part in the multilayer body forming step, the above-mentioned method can electrically connect a pair of leads to each other, which overlap each other while being adjacent to each other in the laminating direction and connected to respective electrodes having polarities different from each other, whereby the electrode bodies can be connected in series, so as to improve the output of the electrochemical device.

When the sealing member of the multilayer body and the opening part are fused together while providing a portion where a thickness of the sealing member from a surface of the outer package to a surface of the lead in the laminating direction of the electrode bodies on one side of the lead differs from that on the other side of the lead in the sealing step such that the two leads connected to one electrode body are arranged within the same plane perpendicular to the laminating direction of the electrode bodies after the sealing step, the opening part is completely filled with the sealing member that is in close contact with the surroundings of the leads, whereby distortions in the sealed opening part can be suppressed.

Preferably, in the present invention, the sealing member of the multilayer body and the opening part are fused together in the sealing step such that the total thickness of the sealing member arranged on one side and the other side of the leads in the laminating direction of the electrode bodies is made substantially the same in all of lead takeout portions in the opening part.

This makes the present invention remarkably exhibit its effect of restraining distortions and gaps from being formed in the opening part of the outer package.

Preferably, in the present invention, the sealing member has such a length as to hold a part of two leads and extend to all of lead takeout portions in the opening part of the outer package in the terminal member forming step.

When terminal members formed by using a sealing member having such a length as to extend to all the lead takeout portions in the opening part of the outer package are laminated on each other as a part of the elemental device in the multilayer body forming step, the total thickness of the sealing member arranged on one side and the other side of the leads in the laminating direction of the electrode bodies can easily be made substantially the same in all the lead takeout portions in the opening part in the sealing step. When one terminal member made of two leads and a sealing member is used, the elemental device can be made more easily than in the case where two terminal members each composed of one lead and a sealing member are used.

As in the foregoing, the present invention can provide an electrochemical device which can improve output and restrain distortions and gaps from being formed at an opening part of an outer package, and a method of manufacturing such an electrochemical device.

DESCRIPTION OF THE PREFERRED EMBODIMENTS

Figure 1:
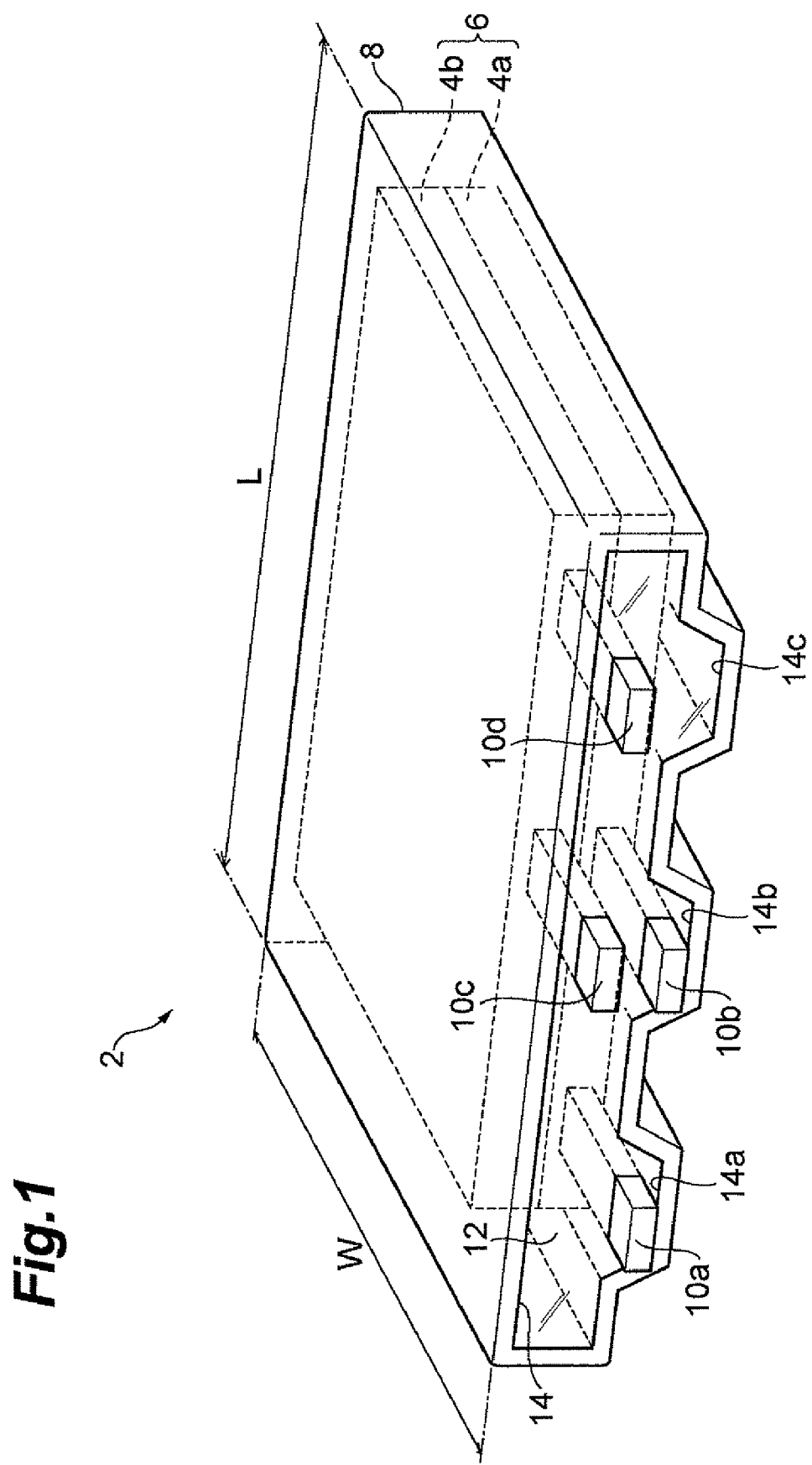
FIG. 1 is a perspective view showing a lithium-ion secondary battery which is a preferred embodiment of the electrochemical device in accordance with the present invention.

In the following, a lithium-ion secondary battery (hereinafter referred to as battery 2) which is a preferred embodiment of the present invention will be explained in detail with reference to the drawings. In the drawings, the same or equivalent parts will be referred to with the same numerals or letters while omitting their overlapping explanations. Positional relationships such as those of upper, lower, left, and right are based on those shown in the drawings unless otherwise specified. Ratios of dimensions in the drawings are not limited to those depicted.

Lithium-Ion Secondary Battery

Figure 2:
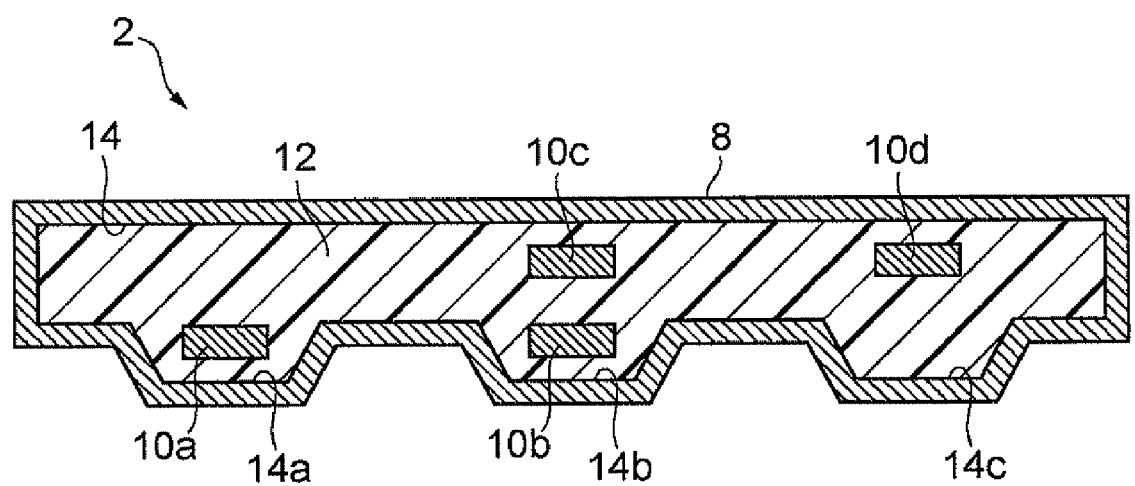
FIG. 2 is a schematic end face view showing the lithium-ion secondary battery of FIG. 1 as seen from its opening part side.

As shown in FIGS. 1 and 2, a multilayer body 6 formed by laminating two electrode bodies 4a, 4b each having positive and negative electrodes laminated with a separator interposed therebetween are accommodated in an outer package 8 in the battery 2 in accordance with this embodiment. FIGS. 1 and 2 omit the positive and negative electrodes and separators.

In the multilayer body 6, the two electrode bodies 4a, 4b are laminated with a partition (not depicted) interposed therebetween. The partition is made of a material which is impermeable to respective electrolytic solutions contained in the two electrode bodies 4a, 4b. Providing the partition can keep the respective electrolytic solutions contained in the two electrode bodies 4a, 4b from mixing with each other and restrain the voltage of the battery 2 from decreasing.

Planar leads 10a, 10b are electrically connected to the positive and negative electrodes in the electrode body 4a, respectively. Planar leads 10c, 10d are electrically connected to the positive and negative electrodes in the electrode body 4b, respectively.

A sealing member 12 is in close contact with surroundings of the leads 10a to 10d, and is held by an opening part 14 of the outer package 8, so as to seal the opening part 14. The leads 10a to 10d extending from the multilayer body 6 project out of the outer package 8 at the opening part 14.

Portions where the leads 10 extend from within the outer package 8 to the outside thereof through the sealing member 12 are referred to as lead takeout portions 14a, 14b, 14c. In the battery 2, one surface of the outer package 8 is formed in a concavo-convex pattern, such as to form three lead takeout portions 14a, 14b, 14c. The other surface of the outer package 8, which is made flat, is placed on a reference surface when mounted to an electronic device. Since one surface of the outer package 8 is formed in a concavo-convex pattern, the sealing member 12 converges on the surroundings of the leads positioned at the lead takeout portions 14a, 14b, 14c when fusing the opening part 14 and sealing member 12 together, whereby the hermeticity of the opening part 14 improves.

In the battery 2, the two electrode bodies 4a, 4b are laminated such as to yield portions where different numbers of leads 10 overlap each other in the laminating direction of the electrode bodies 4a, 4b in the opening part 14. That is, one lead 10a is arranged at the lead takeout portion 14a on one end side of the opening portion 14, one lead 10d is arranged at the lead takeout portion 14c on the other end side, and two leads 10b, 10c overlapping each other in the laminating direction are arranged at the lead takeout portion 14b positioned at the center of the opening part 14. One of the two leads 10b, 10c positioned at the center of the lead takeout portion 14b is connected to the positive electrode, while the other is connected to the negative electrode.

Since a pair of leads 10b, 10c overlapping each other while being adjacent to each other in the laminating direction of the electrode bodies 4a, 4b and connected to respective electrodes having polarities different from each other are electrically connected to each other in the portions where different numbers of leads overlap each other in the laminating direction of electrode bodies in the opening part 14 in this embodiment, the two electrode bodies 4a, 4b can be connected in series, so as to improve the voltage of the battery 2.

As shown in FIG. 2, the thickness of the sealing member 12 from the surface of the outer package 8 to the surface of the lead 10 in the laminating direction of the electrode bodies 4a, 4b on one side (upper side) of the lead 10 differs from that on the other side (lower side) of the lead 10. Specifically, the thickness of the sealing member 12 filling the upper gap between the lead 10a and the outer package 8 is greater than that of the sealing member 12 filling the lower gap between the lead 10a and the outer package 8. The thickness of the sealing member 12 filling the lower gap between the lead 10d and the outer package 8 is greater than that of the sealing member 12 filling the upper gap between the lead 10d and the outer package 8. When the thickness of the sealing member 12 from the surface of the outer package 8 to the surface of the lead 11a, 10d in the laminating direction of the electrode bodies 4a, 4b on one side (upper side) of the leads 10a, 10d differs from that on the other side (lower side) of the leads 10a, 10d as such, the electrodes 10a, 10b connected to the electrode body 4a are arranged within the same plane perpendicular to the laminating direction of the electrode bodies 4a, 4b, while the leads 10c, 10d connected to the electrode body 4b are arranged within the same plane perpendicular to the laminating direction of the electrode bodies 4a, 4b.

When the thickness of the sealing member 12 from the surface of the outer package 8 to the surface of the lead 10a, 10d in the laminating direction of the electrode bodies 4a, 4b on one side of the leads 10a, 10d differs from that on the other side of the leads 10a, 10d such that the respective pairs of leads 10a, 10b connected to the electrode body 4a and leads 10c, 10d connected to the electrode body 4b are arranged on the same planes perpendicular to the laminating direction of the electrode bodies 4a, 4b, the total thickness of the sealing member 12 and lead 10 becomes substantially uniform in the laminating direction of the electrode bodies 4a, 4b at the lead takeout portions 14a, 14b, 14c. Therefore, the opening part 14 is completely filled with the sealing member 12 that is in close contact with the surroundings of the leads 10a to 10d, whereby distortions can be suppressed in the sealed opening part 14.

Each of the positive electrodes in the electrode bodies 4a, 4b comprises a sheet-like positive electrode current collector and a positive electrode active material layer covering a surface of the positive electrode current collector which opposes the separator and negative electrode. Each of the negative electrodes in the electrode bodies 4a, 4b comprises a sheet-like negative electrode current collector and a negative electrode active material layer covering a surface of the negative electrode current collector which opposes the separator and positive electrode.

Employable as the positive and negative electrode current collectors are current collectors used in known electrochemical devices, examples of which include copper, aluminum, nickel, and the like shaped into band-like forms.

The positive electrode active material layer is a layer containing a positive electrode active material (cathode active material), a conductive auxiliary agent, a binder, and the like. The cathode active material is not restricted in particular as long as it allows occlusion and release of lithium ions, desorption and insertion of lithium ions (intercalation), or doping and undoping of lithium ions and counter anions of the lithium ions (such as $PF_6^-$) to proceed reversibly; known electrode active materials can be used therefor. Examples of the cathode active material include lithium cobaltate ($LiCoO_2$), lithium nickelate ($LiNiO_2$), lithium manganese spinel ($LiMn_2O_4$), and mixed metal oxides such as those expressed by the general formula of $LiNi_xCo_yMn_zM_aO_2$ (where $x+y+z+a=1, 0 \leq x \leq 1, 0 \leq y \leq 1, 0 \leq z \leq 1, 0 \leq a \leq 1$, and M is at least one kind of element selected from Al, Mg, Nb, Ti, Cu, Zn, and Cr), a lithium vanadium compound ($LiV_2O_5$), olivine-type $LiMPO_4$ (where M is at least one kind of element selected from Co, Ni, Mn or Fe, Mg, Nb, Ti, Al, and Zr, or VO), and lithium titanate ($Li_4Ti_5O_{12}$).

The negative electrode active material layer is a layer containing a negative electrode active material (anode active material), a conductive auxiliary agent, a binder, and the like. The anode active material is not restricted in particular as long as it allows occlusion and release of lithium ions, desorption and insertion of lithium ions (intercalation), or doping and undoping of lithium ions and counter anions of the lithium ions (such as $PF_6^-$) to proceed reversibly; known anode active materials can be used therefor. Examples of the anode active material include carbon materials such as natural graphite, synthetic graphite, non-graphitizing carbon, graphitizable carbon, and low-temperature-firable carbon; metals such as Al, Si, and Sn which are combinable with lithium; amorphous compounds mainly composed of oxides such as SiO, $SiO_x$, $SiO_2$, and $SnO_2$; lithium titante ($Li_4Ti_5O_{12}$); and $TiO_2$. Preferred among them are carbon materials. More preferred are carbon materials having an interlayer distance $d_{002}$ of 0.335 to 0.338 nm and a crystallite size $Lc_{002}$ of 30 to 120 nm. Examples of carbon materials that satisfy such a condition include synthetic graphite, MCF (mesocarbon fiber), and MCMB (mesocarbon microbeads). The above-mentioned interlayer distance $d_{002}$ and crystallite size $Lc_{002}$ can be determined by X-ray diffraction.

As the separator, one formed from an electrically insulating porous body can be used, for example. Examples of the electrically insulating porous body include single-layer or multilayer films made of polyethylene, polypropylene, or a polyolefin, drawn films of resin mixtures, and fiber nonwoven cloth composed of at least one kind of constituent material selected from the group consisting of cellulose, polyester, and polypropylene.

The positive and negative electrodes and separator contain an electrolytic solution (not depicted) therewithin. As the electrolytic solution, a nonaqueous electrolytic solution in which a lithium salt is dissolved in an organic solvent is used. Examples of the lithium salt include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. These salts may be used singly or in combinations of two or more species. The electrolytic solution may be gelled with polymers and the like added thereto.

As the organic solvent for the electrolytic solution, any solvent used in known batteries can be employed. For example, single or mixed solvents of ring carbonates, linear carbonates, lactones, and esters can be used. Preferred specific examples include propylene carbonate, ethylene carbonate, and diethyl carbonate. They may be used singly, or two or more species may be used as a mixture in any proportions.

As the outer package 8, any of metal cans constituted by aluminum or stainless steel and resin-film-coated metal foils of aluminum or stainless steel can be used.

As the sealing member 12, a material which adheres well to the opening part 14 at the time of fusing thereto is used. Specific examples include ethylene/vinyl acetate copolymers, ethylene/acrylate copolymers, and polypropylene polymers.

The thickness of the positive or negative electrode current collector is about 5 to 50 μm. The thickness of the positive or negative electrode active material layer is about 1 to 200 μm. The thickness of the separator is about 5 to 50 μm. Each of the electrode bodies 4a, 4b has a thickness of about 0.25 to 5 mm. The thickness of the partition is about 10 to 100 μm. Each of the leads 10a to 10d has a thickness of about 50 to 1000 μm. The wall of the outer package 8 has a thickness of about 10 to 500 μm. The battery 2 has the maximum thickness of about 0.5 to 10 mm in the takeout portions 14a to 14c and a thickness of about 0.5 to 10 mm therebetween. The battery 2 has a longitudinal length L of about 10 to 50 mm in a direction perpendicular to the laminating direction of the electrode bodies 4a, 4b and a width W of about 10 to 50 mm.

Method of Manufacturing Lithium-Ion Secondary Battery

A method of manufacturing the battery 2, which is a preferred embodiment of the method of manufacturing an electrochemical device of the present invention, will now be explained in detail. The method of manufacturing the battery 2 in accordance with this embodiment comprises an electrode body forming step, a terminal member forming step, an elemental device forming step, a multilayer body forming step, an accommodating step, and a sealing step.

Electrode Body Forming Step

The electrode body forming step laminates positive and negative electrodes with a separator interposed therebetween, so as to form electrode bodies 4a, 4b.

Terminal Member Forming Step

The terminal member forming step holds a part of one or two planar leads 10 by a band-like sealing member 12 from both sides of the leads so as to form a terminal member 16 made of the one or two leads 10 and the sealing member 12.

Figure 3:
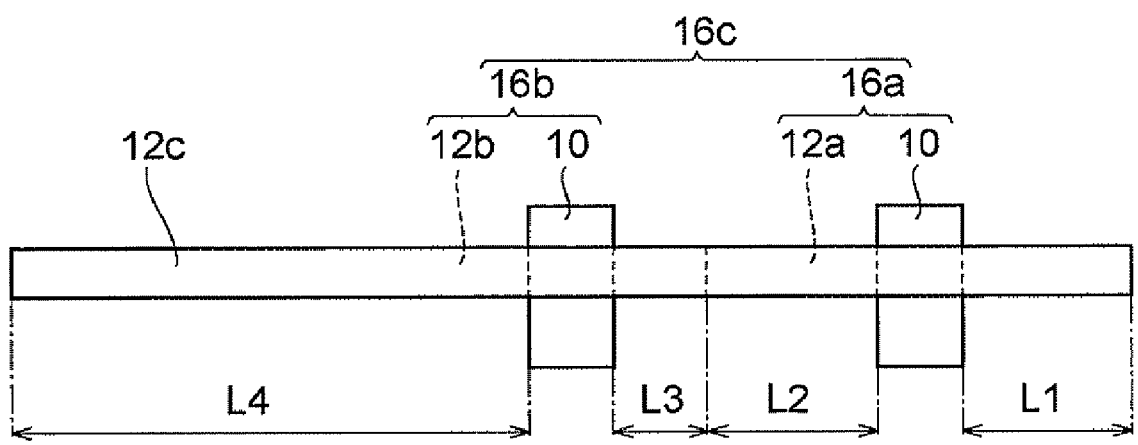
FIG. 3 is a top plan view of a terminal member used in a method of manufacturing the lithium-ion secondary battery of FIG. 1.
Figure 4:
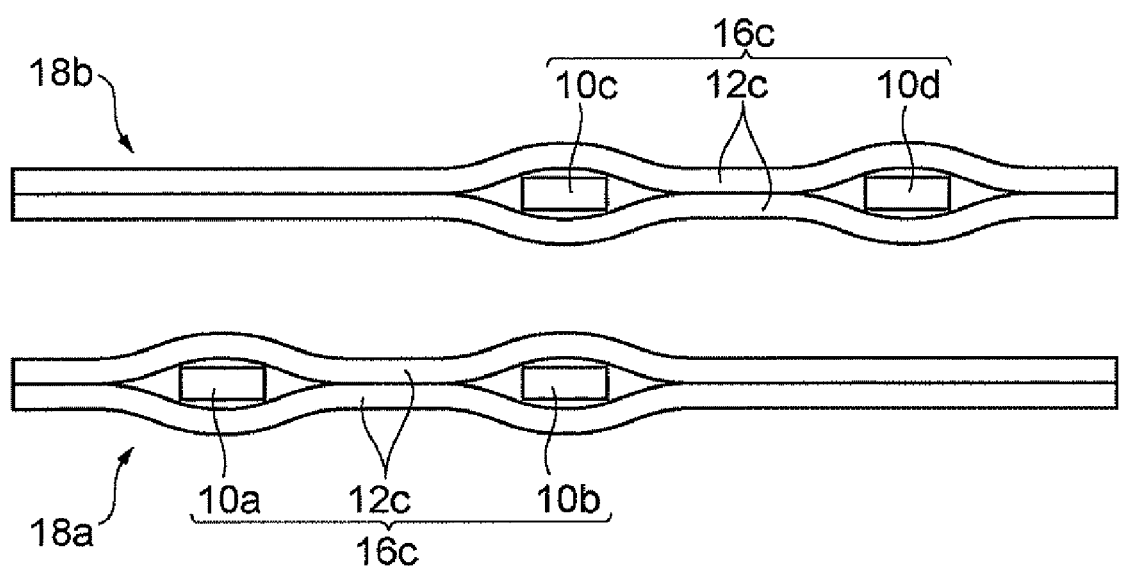
FIG. 4 is a side view of terminal members (elemental devices) used in a method of manufacturing the lithium-ion secondary battery of FIG. 1.

Employable as the terminal member 16 are a terminal member 16a composed of one lead 10 and a sealing member 12a and a terminal member 16b composed of one lead 10 and a sealing member 12b as shown in FIGS. 3 and 4. The sealing members 12a, 12b represent respective parts of a sealing member 12c formed by integrating them. The terminal member 16a can be formed by holding a part of the lead 10 from both sides thereof with center parts of the band-like sealing members 12a. The terminal member 16b can be formed by holding a part of the lead 10 from both sides thereof with portions of the band-like sealing member 12b between their center and end parts. When the thickness of the leads 10a to 10d is 50 to 1000 μm, each of the sealing members 12a, 12b has a thickness of about 60 to 1200 μm. The terminal members 16a, 16b (i.e., sealing members 12a, 12b) are not required to be integrated with each other. A part of the terminal member 16b may be substituted by a member in which the terminal member 16a and the sealing member 12a alone are assembled without being integrated with each other.

In the terminal member 16a, the length L1 of the sealing member 12a extending from the lead 10 to one side in the lateral direction equals the length L2 of the sealing member 12a extending from the lead 10 to the other side in the lateral direction. In the terminal member 16b, on the other hand, the length L3 of the sealing member 12a extending from the lead 10 to one side in the lateral direction is shorter than the length L4 of the sealing member 12a extending from the lead 10 to the other side in the lateral direction.

Preferably, the terminal member forming step uses the sealing member 12c having such a length as to hold a part of two leads 10 and extend to all of the lead takeout portions 14a, 14b, 14c in the opening part 14 of the outer package 8. That is, a terminal member 16c having a structure in which the terminal members 16a, 16b are integrated with each other is preferably formed by holding a part of two planar leads 10 from both sides thereof with the band-like sealing members 12c in which the sealing members 12a, 12b are integrated with each other. In the following, the method of manufacturing the battery 2 using the terminal member 16c will be explained.

Elemental Device Forming Step

The elemental device forming step electrically connects respective leads 10 of the terminal member 16c to the positive and negative electrodes of the electrode body 4a, so as to form an elemental device 18a in which two leads 10a, 10b having the sealing members 12c attached thereto are connected to one electrode body 4a (not depicted) as shown in FIG. 4. As with the elemental device 18a, an elemental device 18b in which two leads 10c, 10d having the sealing members 12c attached thereto are connected to one electrode body 4b (not depicted) is formed.

Multilayer Body Forming Step

The multilayer forming step laminates two elemental devices 18a, 18b, which are formed by using the electrode bodies 4a, 4b, such as to yield portions where different numbers of leads 10 overlap each other in the laminating direction of the electrode bodies 4a, 4b in the opening part 14 of the outer package 8 (see FIGS. 1 and 2), thereby forming a multilayer body composed of the elemental devices 18a, 18b (hereinafter referred to as multilayer body). That is, as shown in FIG. 4, the elemental devices 18a, 18b are laminated in such a positional relationship that the leads 10b, 10c overlap each other in the laminating direction of the elemental devices 18a, 18b while the lead 10a of the elemental device 18a and the lead 10d of the elemental device 18b hold the leads 10b, 10c therebetween. One of the leads 10b, 10c is connected to the positive electrode, while the other is connected to the negative electrode. When a pair of the sealing members 12c holding two leads 10 therebetween are counted as one unit of the sealing members 12c in thus obtained multilayer body, the number of laminations of the elemental devices 18a, 18b coincides with the number of units of the sealing members 12c. As a consequence, the total thickness of the sealing members 12c arranged on one side and the other side of the leads 10a to 10d in the laminating direction of the electrode bodies 4a, 4b can be made substantially the same in the multilayer body.

Accommodating Step

The accommodating step accommodates the multilayer body in the outer package 8 such that the leads 10a to 10d and the sealing members 12c holding them in the multilayer body are arranged at the opening part 14 of the outer package 8.

Sealing Step

As shown in FIGS. 1 and 2, the sealing step fuses the sealing members 12c of the multilayer body and the opening part 14 together, so as to seal the opening part 14 in such a state that the leads 10a to 10d extend from the respective lead takeout parts 14a to 14c to the outside of the outer package 8. The sealing members 12c of the multilayer body and the opening part 14 are fused together while providing portions where the thickness of the sealing member 12c from the surface of the outer package 8 to the surface of the lead 10a to 10d in the laminating direction of the electrode bodies 4a, 4b on one side of the leads 10a to 10d differs from that on the other side of the leads 10a to 10d in the sealing step such that the two leads 10a, 10b connected to the electrode body 4a are arranged within the same plane perpendicular to the laminating direction of the electrode bodies 4a, 4b and the two leads 10c, 10d connected to the electrode body 4b are arranged within the same plane perpendicular to the laminating direction of the electrode bodies 4a, 4b after the sealing step. This yields the battery 2.

Preferably, the sealing step fuses the sealing members 12c of the multilayer body and the opening part 14 together such that the total thickness of the sealing members 12c (sealing member 12 in the battery 2) arranged on one side and the other side of the leads 10a to 10d in the laminating direction of the electrode bodies 4a, 4b is made substantially the same in all of the lead takeout portions 14a to 14c in the opening part 14. As a consequence, the effect of restraining distortions and gaps from being formed in the opening part 14 of the outer package 8 becomes remarkable. Here, "substantially the same" means that the fluctuation in the total thickness of the sealing members 12c in parts corresponding to the lead takeout portions 14a to 14c before fusion is so small that none of distortions and gaps occurs in the opening part 14 of the resulting battery 2. More specifically, with respect to the total thickness of the sealing member 12 before fusion in a part corresponding to one lead takeout portion in the resulting battery 2, the total thickness of the sealing member 12 before fusion in a part corresponding to a lead takeout portion adjacent to the former lead takeout portion preferably falls within the range of 85 to 115%. After the fusion, with respect to the total thickness of the sealing member 12 and lead 10 in one lead takeout portion in the resulting battery 2, the total thickness of the sealing member 12 and lead 10 in the lead takeout portion adjacent to the former lead takeout portion preferably falls within the range of 40 to 160%.

In this embodiment, the multilayer body forming step laminates two elemental devices 18a, 18b such as to yield portions where different numbers of leads 10 overlap each other in the laminating direction of the electrodes 4a, 4b (i.e., the laminating direction of the elemental devices 18a, 18b) in the opening part 14. Specifically, portions where only one lead 10 is arranged as in the lead takeout portions 14a, 14c and a portion where two leads 10b, 10c overlap each other in the laminating direction as in the lead takeout portion 14b are generated. As a consequence, the leads 10b, 10c can electrically be connected to each other, so as to connect the electrode bodies 4a, 4b in series, thereby improving the voltage of the battery 2.

By fusing the sealing members 12c of the multilayer body and the opening part 14 together while providing portions where the thickness of the sealing member 12c from the surface of the outer package 8 to the surface of the leads 10a to 10d in the laminating direction of the electrode bodies 4a, 4b on one side of the leads 10a to 10d differs from that on the other side of the leads 10a to 10d in the sealing step such that the leads 10a, 10b connected to the electrode body 4a are arranged within the same plane perpendicular to the laminating direction of the electrode bodies 4a, 4b and the leads 10c, 10d connected to the electrode body 4b are arranged within the same plane perpendicular to the laminating direction of the electrode bodies 4a, 4b after the sealing step, this embodiment completely fills the opening part 14 with the sealing member 12 that is in close contact with the surroundings of the leads 10a to 10d in the resulting battery 2, and thus can suppress distortions in the opening part 14.

In this embodiment, the terminal members 16c formed by using the sealing members 12c having such a length as to extend to all the lead takeout portions 14a, 14b, 14c in the opening part 14 of the outer package 8 are laminated on each other as a part of the elemental devices 18a, 18b in the multilayer body forming step, whereby the total thickness of the sealing members 12c arranged on one side and the other side of the lead 10 in the laminating direction of the electrode bodies 4a, 4b can easily be made substantially the same in all the lead takeout portions 14a, 14b, 14c in the sealing step. Using one terminal member 16c composed of two leads 10 and a pair of sealing members 12c holding them makes it easier to form the elemental devices 18a, 18b than in the case using the terminal members 16a, 16b each combining one lead with a sealing member.

Figure 6:
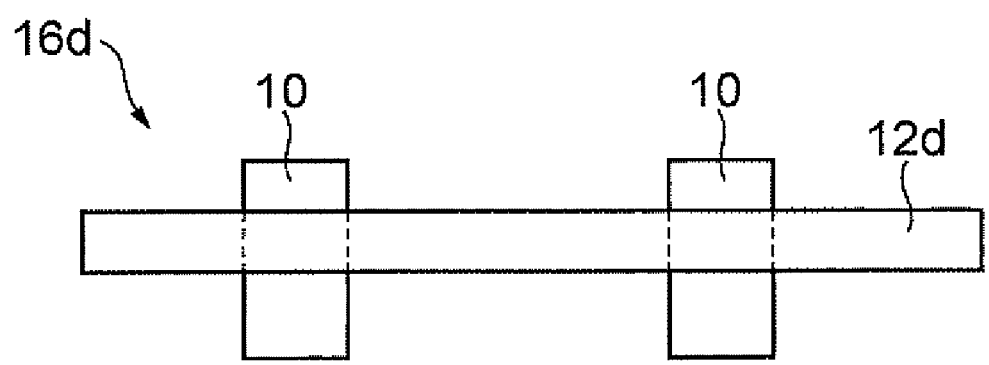
FIG. 6 is a top plan view of a terminal member used in a conventional method of manufacturing a lithium-ion secondary battery.
Figure 7:
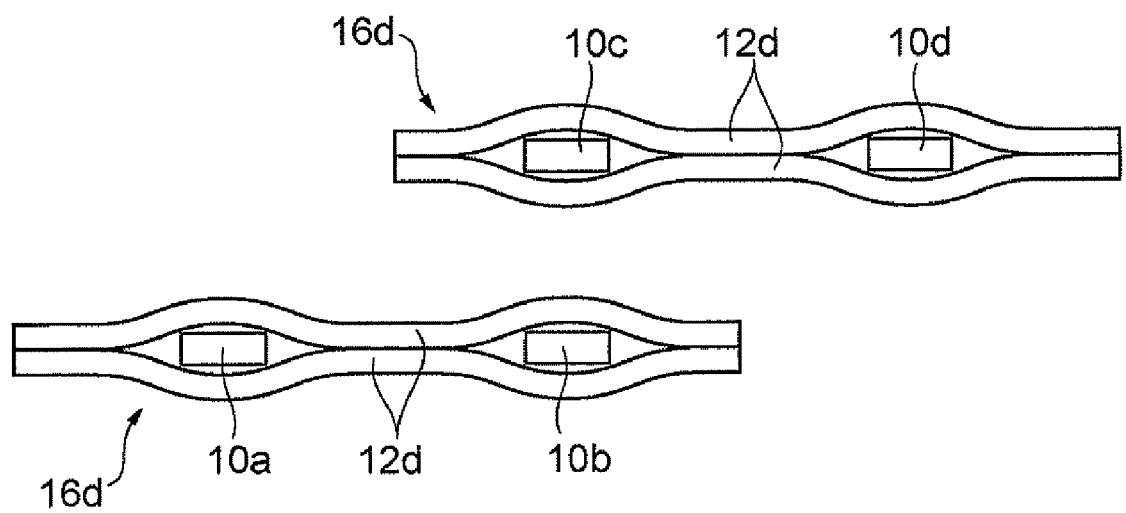
FIG. 7 is a side view of terminal members (elemental devices) used in the conventional method of manufacturing a lithium-ion secondary battery.
Figure 8:
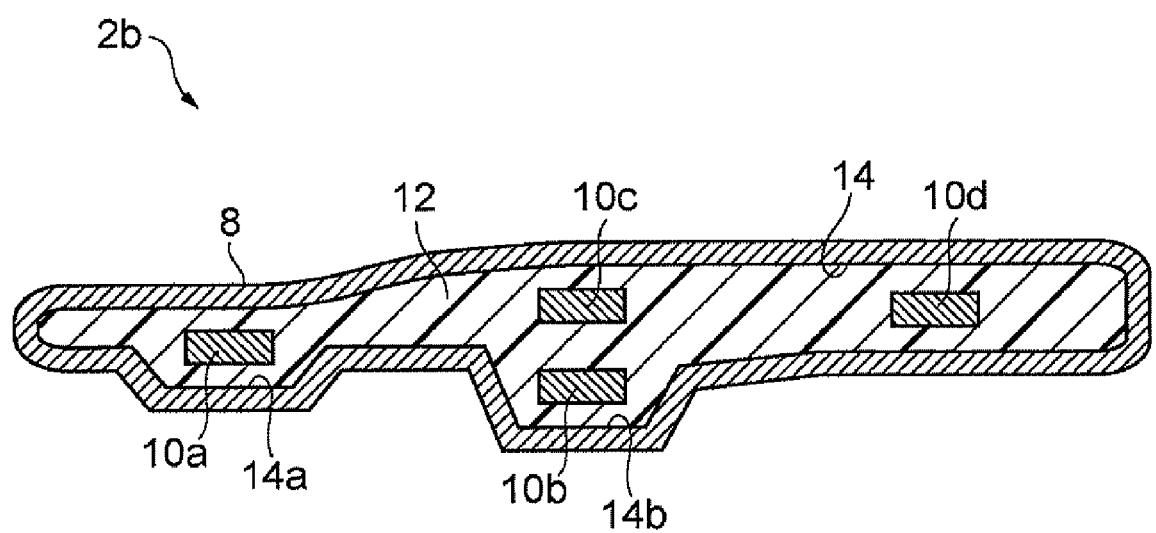
FIG. 8 is a schematic end face view of the lithium-ion secondary battery made by the conventional method of manufacturing a lithium-ion secondary battery as seen from the opening part side.

When terminal members 16d each formed by using a sealing member 12d which is not long enough to reach all the lead takeout portions 14a, 14b, 14c in the opening part 14 of the outer package 8 as shown in FIG. 6 are laminated such as to yield portions where different numbers of leads 10 overlap each other in the laminating direction as shown in FIG. 7 as in a conventional case, the total thickness of the sealing members 12d arranged on one side and the other side of the lead 10 in the laminating direction becomes uneven. As a result, there are possibilities of gaps unfilled with the sealing member 12 occurring, the opening part 14 and partition distorting, and the leads 10a and 11b or the leads 10c and 10d failing to be arranged on the same plane perpendicular to the laminating direction of the electrode bodies 4a, 4b. This embodiment can suppress the occurrence of these troubles.

Though preferred embodiments of the electrochemical device and method of manufacturing the same in accordance with the present invention are explained in detail in the foregoing, the present invention is not limited to the above-mentioned embodiments. For example, though the above-mentioned embodiments relate to a case where the electrochemical device is the battery 2 (lithium-ion secondary battery), the electrochemical device of the present invention is not limited thereto but may be any of secondary batteries other than the lithium-ion secondary battery, e.g., metal lithium secondary batteries, lithium capacitors, electric double-layer capacitors, and the like. In the case of the electrochemical devices other than the lithium-ion secondary battery, electrode active materials suitable for the electrochemical devices may be used. In the case of the electric double-layer capacitors, for example, acetylene black, graphite, activated carbon, and the like are used as active materials contained in the cathode and anode active material containing layers. Examples of the electrolytic solution for use include solutions of quaternary ammonium salts such as tetraethylammonium tetrafluoroborate in organic solvents such as propylene carbonate, diethylene carbonate, and acetonitrile.

The electrochemical device of the present invention is also usable for a power supply for a self-propelled micromachine, an IC card, or the like and a dispersed power supply located on or in a printed circuit board.

Figure 5:
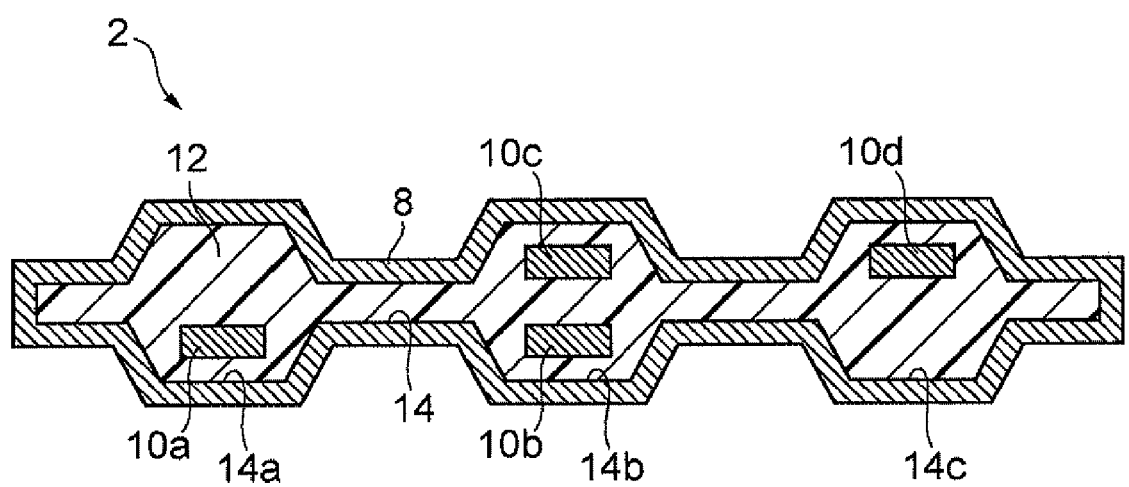
FIG. 5 is a schematic end face view of a lithium-ion secondary battery which is another embodiment of the electrochemical device in accordance with the present invention as seen from the opening part side.

Both sides of the opening part 14 of the outer package 8 may be formed in a concavo-convex pattern as shown in FIG. 5. The number of electrode bodies constituting the multilayer body 6 may be 3 or more.

EXAMPLES

The present invention will now be explained more specifically with reference to an example, which does not restrict the present invention.

Example

In Example, the lithium-ion secondary battery (battery 2) shown in FIGS. 1 and 2 was made. The battery 2 comprises an outer package 8 accommodating a multilayer body 6 formed by laminating two electrode bodies 4a, 4b each having positive and negative electrodes laminated with a separator interposed therebetween, planar leads 10a to 10d respectively connected to the positive and negative electrodes while extending from the multilayer body 6 to the outside of the outer package 8, and a sealing member 12 in close contact with the surroundings of the leads 10a to 10d and held by the opening part 14 of the outer package 8 so as to seal the opening part 14. One lead 10a is arranged at the lead takeout portion 14a on one end side of the opening part 14, one lead 10d is arranged at the lead takeout portion 14c on the other end side, and two leads 10b, 10c overlapping each other in the laminating direction are arranged at the lead takeout portion 14b positioned at the center of the opening part 14. The thickness of the sealing member 12 filling the upper gap between the lead 10a and the outer package 8 is greater than the thickness of the sealing member 12 filling the lower gap between the lead 10a and the outer package 8. The thickness of the sealing member 12 filling the lower gap between the lead 10d and the outer package 8 is greater than the thickness of the sealing member 12 filling the upper gap between the lead 10d and the outer package 8. The leads 10a, 10b connected to the electrode body 4a are arranged within the same plane perpendicular to the laminating direction of the electrode bodies 4a, 4b, while the leads 10c, 10d connected to the electrode body 4b are arranged within the same plane perpendicular to the laminating direction of the electrode bodies 4a, 4b.

The above-mentioned lithium-ion secondary battery was made by a manufacturing method comprising an electrode body forming step, a terminal member forming step, an elemental device forming step, a multilayer body forming step, an accommodating step, and a sealing step as shown in the following.

Electrode Body Forming Step

A coating material formed by dispersing a mixture of $LiCoO_2$, PVdF, and acetylene black at a volume ratio of 75:15:10 into NMP was applied to both sides of an aluminum foil having a thickness of 0.02 mm, and then NMP was removed, so as to form active material layers. The total thickness of the aluminum foil and active material layers was 0.12 mm. The aluminum foil formed with the active material layers was cut into a size of 14 m×10 mm, so as to yield a positive electrode. Here, an uncoated part exposing the aluminum foil was formed by a length of 4 mm from a longitudinal end part on both sides of thus cut positive electrode.

A coating material formed by dispersing a mixture of graphite, PVDF, and acetylene black at a volume ratio of 75:15:10 into NMP was applied to both sides of a copper foil having a thickness of 0.02 mm, and then NMP was removed, so as to form active material layers. The total thickness of the copper foil and active material layers was 0.10 mm. The copper foil formed with the active material layers was cut into a size of 14 mm×10 mm, so as to yield a negative electrode. Here, an uncoated part exposing the copper foil was formed by a length of 4 mm from a longitudinal end part on both sides of thus cut negative electrode.

Thus obtained positive and negative electrodes were laminated with a separator (polyolefin porous body in a size of 14 mm×10 mm) having a thickness of 0.07 mm interposed therebetween, so as to make the electrode bodies 4a, 4b.

Terminal Member Forming Step

In the terminal member forming step, a part of the two planar leads 10a, 10b were held with band-like sealing members 12c from both sides of the leads 10, so as to form a terminal member 16c composed of two leads 10a, 10b and the sealing members 12c as shown in FIGS. 3 and 4. Similarly, a terminal member 16c composed of two leads 10c, 10d and the sealing members 12c was formed. In the terminal members 16c, portions where only the sealing members 12c existed without any lead were formed on the opposite sides of the leads 10b, 10c at the longitudinal center parts of the sealing members 12c from the leads 10a, 10d on the end part sides, respectively.

As each of the leads 10a to 10d, a nickel foil having a size of 2 mm in width×10 mm in length×0.03 mm in thickness was used. As the sealing member 12c, a polyolefin sheet having a size of 3 mm in width×11 mm in length was used. The length of 11 mm in the polyolefin sheet was made identical to the longitudinal length 11 mm in the opening part 14 of the outer package 8. Thus, the terminal members 16c were formed by using the sealing members 12c each having such a length as to hold a part of the two leads 10 and extend to all the lead takeout portions 14a, 14b, 14c in the opening part 14 of the outer package 8.

Elemental Device Forming Step

In the elemental device forming step, the lead 10a of the terminal member 16c was ultrasonically welded to an end portion of the uncoated part in the negative electrode of the electrode body 4a, while the lead 10b of the terminal member 16c was ultrasonically welded to the center of the uncoated part in the positive electrode of the electrode body 4a, whereby an elemental device 18a in which two leads 10a, 10b having the sealing members 12c attached thereto were connected to one electrode body 4a (not depicted) was formed as shown in FIG. 4. Also, the lead 10c of the terminal member 16c was ultrasonically welded to the center of the uncoated part in the negative electrode of the electrode body 4b, while the lead 10d of the terminal member 16c was ultrasonically welded to an end portion of the uncoated part in the positive electrode of the electrode body 4b, whereby an elemental device 18b in which two leads 10c, 10d having the sealing members 12c attached thereto were connected to one electrode body 4b (not depicted) was formed.

Multilayer Body Forming Step

In the multilayer body forming step, the elemental devices 18a, 18b were laminated with a polyimide sheet having a thickness of 0.03 mm interposed therebetween, so as to form a multilayer body as shown in FIG. 4. The elemental devices 18a, 18b were laminated in such a positional relationship that the leads 10b, 10c overlapped each other in the laminating direction of the elemental devices 18a, 18b while the lead 10a of the elemental device 18a and the lead 10d of the elemental device 18b held the leads 10b, 10c therebetween, whereby the total thickness of the sealing members 12c arranged on one side and the other side of the leads 10a to 10d in the laminating direction of the electrode bodies 4a, 4b was made substantially the same. The leads 10b, 10c of thus obtained multilayer body were ultrasonically welded to each other.

Accommodating Step

In the accommodating step, the multilayer body was accommodated in the outer package 8 made of an aluminum laminate such that the leads 10a to 10d and the sealing members 12c holding them in the multilayer body were arranged in the opening part 14 of the outer package 8. Further, an electrolytic solution formed by adding 3 wt % of $LiPF_6$ to a mixed solvent of propylene carbonate and ethylene carbonate was injected into the outer package 8.

Sealing Step

In the sealing step, the sealing members 12c arranged throughout the opening part 14 of the outer package 8 as shown in FIGS. 1 and 2 were heated, so as to seal the opening part 14, thereby yielding the lithium-ion secondary battery of Example. In the sealing step, the sealing members 12c of the multilayer body and the opening part 14 were fused together such that the total thickness of the sealing members 12c (sealing member 12 in the battery) arranged on one side and the other side of the leads 10a to 10d in the laminating direction of the electrode bodies 4a, 4b was made substantially the same in all the lead takeout portions 14a to 14c in the opening part 12. As a consequence, after the sealing step, the leads 10a, 10b connected to the electrode body 4a were arranged within the same plane perpendicular to the laminating direction of the electrode bodies 4a, 4b, while the leads 10c, 10d connected to the electrode body 4b were arranged within the same plane perpendicular to the laminating direction of the electrode bodies 4a, 4b.

Comparative Example

In Comparative Example, a polyolefin sheet having a size of 3 mm in width×7.5 mm in length was used as a sealing member. That is, as shown in FIGS. 6 and 7, Comparative Example employed a sealing member 12d which was not long enough to reach all of the lead takeout portions 14a, 14b, 14c in the opening part 14 of the outer package 8, so as to form a terminal member 16d. The electrode bodies 4a, 4b having thus formed terminal members 16d were laminated such as to yield portions where different numbers of leads 10 overlapped each other in the laminating direction as shown in FIG. 7, whereby a multilayer body was formed. Except for using the terminal members 16d as such, the lithium-ion secondary battery of Comparative Example was made as in Example.

Evaluation

The lithium-ion secondary batteries of Example and Comparative Examples were made by 100 each, and the impedance of each lithium-ion secondary battery was measured. Among the impedance values of 100 lithium-ion secondary batteries of Example, the minimum and maximum values were 96 [mΩ] and 100 [mΩ], respectively. Among the impedance values of 100 lithium-ion secondary batteries of Comparative Example, on the other hand, the minimum value was 128.6 [mΩ], while the maximum value diverged at infinity. These results proved that the lithium-ion secondary battery of Example could make the impedance lower than that of the lithium-ion secondary battery of Comparative Example. This seems to result from the suppression of stresses in the welded parts between the leads 10a to 10d and electrode bodies 4a, 4b in the lithium-ion secondary battery of Example.

What is claimed is:

1. A lithium-ion secondary battery comprising:
   electrode bodies each having positive and negative electrodes laminated with a separator interposed therebetween;
   an outer package accommodating a multilayer body formed by laminating at least two of the electrode bodies;
   planar leads respectively connected to the positive and negative electrodes of each of the electrode bodies, the planar leads extending from the multilayer body to the outside of the outer package; and
   a sealing member in close contact with surroundings of the leads and held by an opening part of the outer package so as to seal the opening part;
   wherein the at least two electrode bodies are laminated such as to yield portions where only one of the planar leads of a first electrode body overlaps one of the planar leads of a second electrode body in the laminating direction of the electrode bodies in the opening part; and
   wherein the lithium-ion secondary battery has a portion where a thickness of the sealing member from a surface of the outer package to a surface of one of the planar leads in the laminating direction of the electrode bodies on one side of the one planar lead differs from that on the other side of the one planar lead such that the one planar lead and another of the planar leads respectively connected to the positive and negative electrodes of one of the electrode bodies are arranged within the same plane perpendicular to the laminating direction of the electrode bodies.

2. A method of manufacturing a lithium-ion secondary battery, the method comprising:
   an electrode body forming step of forming an electrode body having positive and negative electrodes laminated with a separator interposed therebetween;
   a terminal member forming step of holding a part of at least one of two planar leads by a band-like sealing member from both sides of the at least one planar lead so as to form a terminal member made of the at least one planar lead and the sealing member;
   an elemental device forming step of electrically connecting the two leads of the terminal member to the positive and negative electrodes, respectively, of the electrode body so as to form an elemental device having the two leads connected to one electrode body, the two leads having the sealing member attached thereto;
   a multilayer body forming step of forming a multilayer body by laminating at least two elemental devices;
   an accommodating step of accommodating the multilayer body in an outer package having an opening part; and
   a sealing step of fusing the sealing member of the multilayer body and the opening part together so as to seal the opening part while the leads extend from a lead takeout portion of the opening part to the outside of the outer package;

wherein the at least two elemental devices are laminated such as to yield portions where only one of the planar leads of a first of the at least two elemental bodies overlap with the planar leads of a second of the at least two elemental bodies in the laminating direction of the elemental devices in the opening part in the multilayer body forming step; and wherein the sealing member of the multilayer body and the opening part are fused together while providing a portion where a thickness of the sealing member from a surface of the outer package to a surface of one of the planar leads in the laminating direction of the electrode bodies on one side of the one planar lead differs from that on the other side of the one planar lead in the sealing step such that the one planar lead and another planar lead of the planar leads respectively connected to the positive and negative electrodes of one of the electrode bodies are arranged within the same plane perpendicular to the laminating direction of the electrode bodies after the sealing step.

3. A method of manufacturing a lithium-ion secondary battery according to claim 2, wherein the sealing member of the multilayer body and the opening part are fused together in the sealing step such that the total thickness of the sealing member arranged on one side and the other side of the one planar lead in the laminating direction of the electrode bodies is made substantially the same in all of the lead takeout portions in the opening part.

4. A method of manufacturing a lithium-ion secondary battery according to claim 2, wherein the sealing member has such a length as to hold a part of the two leads and extend to all of the lead takeout portions in the opening part of the outer package in the terminal member forming step.

5. A lithium-ion secondary battery according to claim 1, the outer package defining a surface having a concavo-convex pattern, and the surface of the outer package forming lead takeout portions, the lead takeout portions including portions of the planar leads extending from the multilayer body to the outside of the outer package.

* * * * *